(12) United States Patent
Hogg

(10) Patent No.: US 11,150,471 B2
(45) Date of Patent: Oct. 19, 2021

(54) DIFFUSERS FOR HEAD UP DISPLAYS

(71) Applicant: BAE SYSTEMS plc, London (GB)

(72) Inventor: Graham Laurence Hogg, Rochester (GB)

(73) Assignee: BAE SYSTEMS plc, London (GB)

( * ) Notice: Subject to any disclaimer, the term of this patent is extended or adjusted under 35 U.S.C. 154(b) by 192 days.

(21) Appl. No.: 16/331,328

(22) PCT Filed: Sep. 5, 2017

(86) PCT No.: PCT/GB2017/052578
§ 371 (c)(1),
(2) Date: Mar. 7, 2019

(87) PCT Pub. No.: WO2018/046903
PCT Pub. Date: Mar. 15, 2018

(65) Prior Publication Data
US 2019/0265471 A1    Aug. 29, 2019

(30) Foreign Application Priority Data

Sep. 8, 2016 (GB) .................................... 1615283

(51) Int. Cl.
*G02B 27/10* (2006.01)
*G02B 27/01* (2006.01)
*G02B 3/00* (2006.01)
*G02B 5/02* (2006.01)

(52) U.S. Cl.
CPC ....... *G02B 27/0101* (2013.01); *G02B 3/0037* (2013.01); *G02B 3/0043* (2013.01); *G02B 5/0215* (2013.01); *G02B 5/0278* (2013.01)

(58) Field of Classification Search
CPC .............. G02B 27/0101; G02B 5/0278; G02B 5/0215; G02B 3/005; G02B 3/0056; G02B 3/0006; G02B 3/0037; G02B 3/0043
USPC ................ 359/619, 620, 623, 707, 708, 709
See application file for complete search history.

(56) References Cited

U.S. PATENT DOCUMENTS

| 5,555,476 A | 9/1996 | Suzuki et al. | |
| 7,016,111 B2* | 3/2006 | Chubachi | G02B 5/0215 359/452 |
| 7,684,119 B2* | 3/2010 | Lissotschenko | G02B 3/005 359/623 |
| 8,210,714 B2* | 7/2012 | Chao | G02B 5/0278 362/235 |
| 9,158,124 B2* | 10/2015 | Saisho | G02B 3/0006 |

(Continued)

FOREIGN PATENT DOCUMENTS

| EP | 0640850 A2 | 3/1995 |
| JP | 2003262706 A | 9/2003 |

(Continued)

OTHER PUBLICATIONS

International Preliminary Report on Patentability received for PCT Application No. PCT/GB2017/052578, dated Mar. 21, 2019. 8 pages.

(Continued)

*Primary Examiner* — Audrey Y Chang
(74) *Attorney, Agent, or Firm* — Finch & Maloney PLLC

(57) ABSTRACT

A diffuser for use in a head up display formed of an array of microlenses. The microlenses comprises both concave and convex microlenses to reduce surface discontinuities between adjacent lenses.

7 Claims, 5 Drawing Sheets

(56) References Cited

U.S. PATENT DOCUMENTS

| | | | |
|---|---|---|---|
| 9,349,771 B2* | 5/2016 | Yomori | ................ G02B 3/0043 |
| 2002/0085287 A1 | 7/2002 | Egawa | |
| 2009/0296222 A1 | 12/2009 | Ganser et al. | |
| 2012/0212828 A1 | 8/2012 | Cho et al. | |
| 2015/0370068 A1 | 12/2015 | Fujikawa et al. | |
| 2015/0370069 A1 | 12/2015 | Saisho et al. | |
| 2018/0031830 A1* | 2/2018 | Koike | ................ G02B 27/0081 |

FOREIGN PATENT DOCUMENTS

| | | | |
|---|---|---|---|
| JP | 2006003522 A | 1/2006 |
| JP | 2007328117 A | 12/2007 |
| JP | 2009151154 A | 7/2009 |
| WO | 2018046903 A1 | 3/2018 |

OTHER PUBLICATIONS

International Search Report and Written Opinion received for PCT Application No. PCT/GB2017/052578, dated Nov. 23, 2017. 10 pages.

GB Search Report received for GB Application No. 1615283.7, dated Mar. 1, 2017. 4 pages.

\* cited by examiner 60  61

DIFFUSERS FOR HEAD UP DISPLAYS

This disclosure relates to optical systems for the projection of light into a head up display.

Head up displays utilise a transparent component, which the user looks through, to overlay an image on the user's actual view of the surroundings. The user's eye receives light from those surroundings in the normal way, and the user's eye also receives light from the head up display system. An image from the head up display is thus overlaid on the actual surroundings.

The transparent component of a head up display (HUD) may be either mounted in a fixed position on equipment being used by a user (for example the cockpit of an aircraft), or on the head of the user (for example as a pair of spectacles, or on a helmet) such that the component moves with the user's head and thus remains at a fixed location in relation to the user's eye.

A fundamental requirement of a HUD is to couple light from an image source to the location required for viewing by the user, known as the output pupil. This is typically achieved using a waveguide system. Conventional HUDs utilise a Cathode Ray Tube (CRT) as an image source. The CRT output is coupled into the HUD optics for guidance to the required output pupil.

CRT displays utilise phosphor light sources which emit a narrow spectrum of light into a near-hemispherical output field. However, CRT displays are becoming outdated and are no longer the preferred choice of light source for HUDs. LEDs are a preferable choice of light source, but their optical output has significantly different properties to CRT displays. Firstly, the optical spectrum is broader than a CRT, and secondly the output is more directional than a CRT output.

HUD optical systems are often optimised for a narrow optical bandwidth, particularly where diffractive optics are utilised to guide light and expand the image. The broader spectrum of LEDs can lead to a degradation of image quality, leading to a need for the light to be filtered to reduce the optical bandwidth prior to transmission through the HUD optics. However, this filtering reduces the optical intensity, thereby reducing the brightness that can be achieved by the HUD, which may lead to inferior system performance. The optical attenuation of the overall optical system must therefore be optimised to avoid further degradation in performance.

There is therefore a requirement for an efficient system to couple image light into the HUD optics.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a microlens array for use in a head up display, the microlens array comprising a plurality of microlenses arranged in an array and forming a contiguous structure, wherein a first face of the microlens array comprises a plurality of microlens surfaces arranged in a regular pattern, each microlens surface corresponding to a microlens in the array of microlenses; and wherein the microlens surfaces alternate between concave and convex along at least one dimension of the array.

The array may be a 1 dimensional array.

The array may be a 2 dimensional array.

Each microlens surface may be hexagonal, rectangular, or square in plan view.

Each microlens surface may be decentred.

Each microlens may be decentred parallel to the dimension in which the microlens surfaces alternate between concave and convex.

The surface height of the centre of each microlens may be different to the surface height of the centre of an adjacent microlens of the same type, such that the surface height difference at the joint between the two lenses is reduced compared to if the surface height at the centre of the microlenses was the same.

The disclosure provided here may provide waveguides which are smaller and lighter than other waveguide designs, but which do not produce stray light paths.

BRIEF DESCRIPTION OF THE DRAWINGS

Embodiments of the invention will be described, by way of example, with reference to the following drawings, in which.

DETAILED DESCRIPTION

Figure 1:
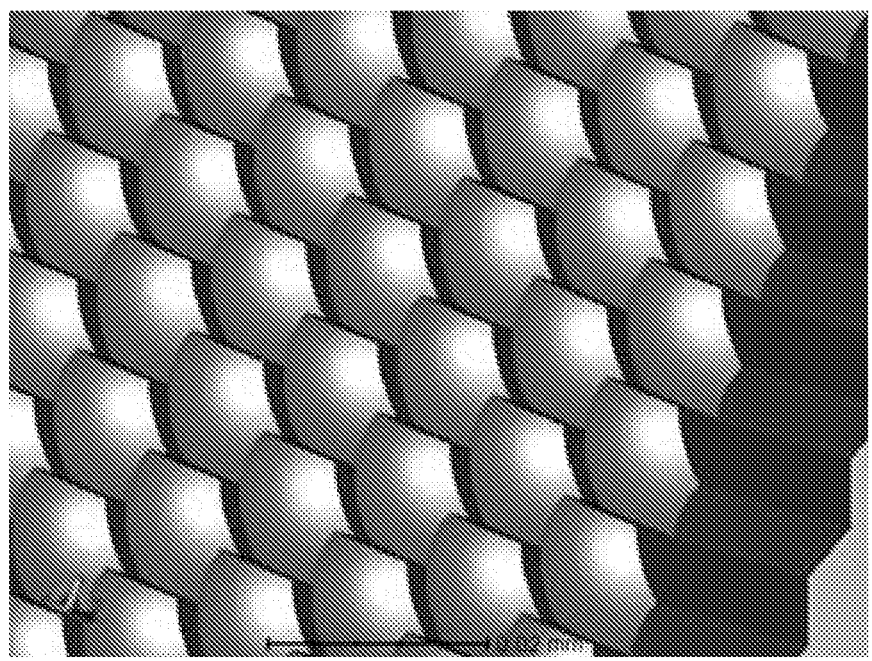
FIG. 1 shows a decentred microlens array.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

As discussed above, LED image sources typically have a more directional output than a CRT source. To improve coupling of this image source into HUD optics, which may be optimised for a CRT source, a diffuser screen may be utilised between the image source and HUD optics. Such a diffuser screen may be formed by a microlens array, as shown in FIG. 1. The array of FIG. 1 comprises a set of hexagonal shaped microlenses packed into an array. Each microlens has a convex shape and is decentred. The microlenses are plano-convex such that the opposite face of the array to that seen in FIG. 1 is planar. That face is aligned at the focal plane of the image projector.

Figure 2:
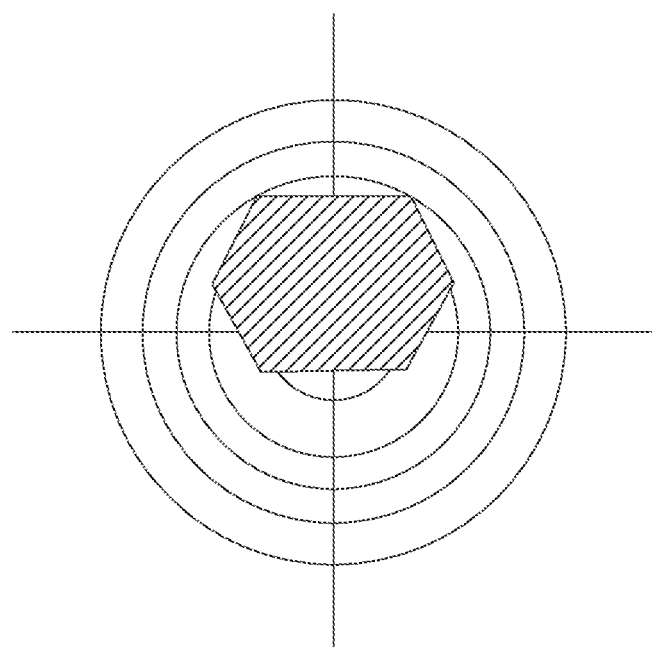
FIG. 2 shows a plot of angular output for the array of FIG. 1.

FIG. 2 shows the angular output from the array of FIG. 1. The angular output is hexagonal in shape (due to each microlens being hexagonal) and off-centre (provided by the decentred microlenses) which gives an efficient coupling into HUD optics.

Figure 3:
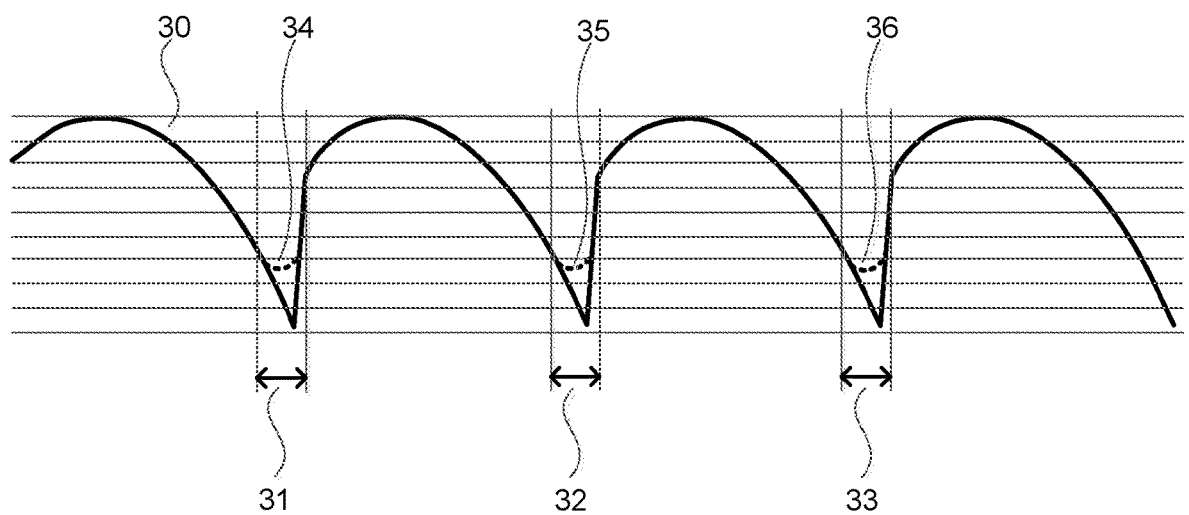
FIG. 3 shows a surface of the array of FIG. 1.

FIG. 3 shows the surface profile of a cross-section through the microlens array of FIG. 1. The solid line 30 indicates the designed profile of the surface. Due to the decentration of the microlenses a sharp intersection occurs in regions 31, 32, 33 between microlenses. However, fabrication techniques cannot reproduce such a sharp, narrow, shape and there is a minimum radius of curvature of the surface, as shown by dashed lines 34, 35, 36.

Due to the errors in surface profile in the regions 34, 35, 36 light propagating through the microlens surface in those regions will not be directed as intended by the optical design and will thus not be directed into the desired output angular range. The light passing through these regions is therefore lost, thus reducing the efficiency of the optical system. Even with perfect reproduction of the design shape, there are still losses in this region due to the need to transition the surface between the different surface heights of the two adjacent microlenses.

Figure 4:
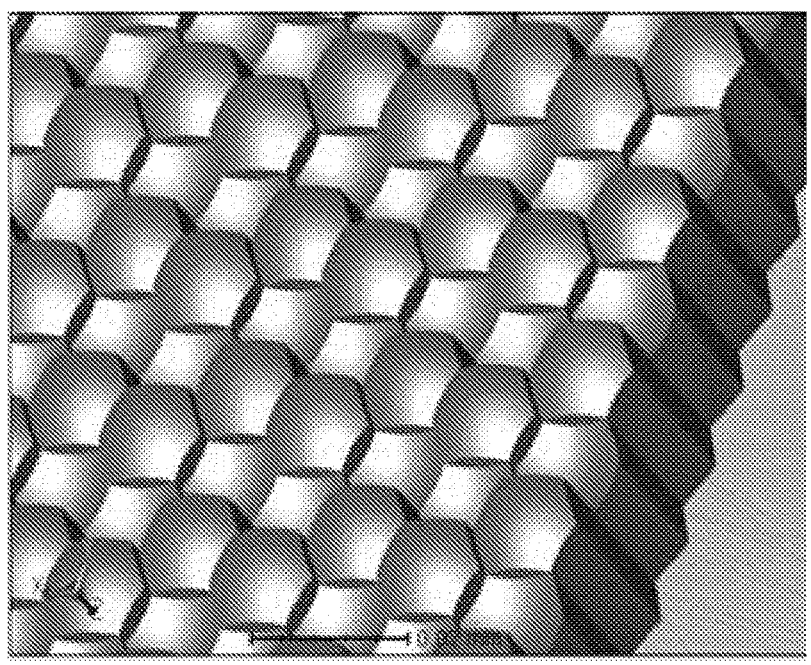
FIG. 4 shows a decentred microlens array with alternating microlens types.

FIG. 4 shows a microlens array which addresses the difficulties of fabricating the sharp direction changes in the microlens array of FIG. 1. The microlens array of FIG. 4 uses alternating convex and concave microlenses in the y axis, with each microlens decentred along that of the array.

Figure 5:
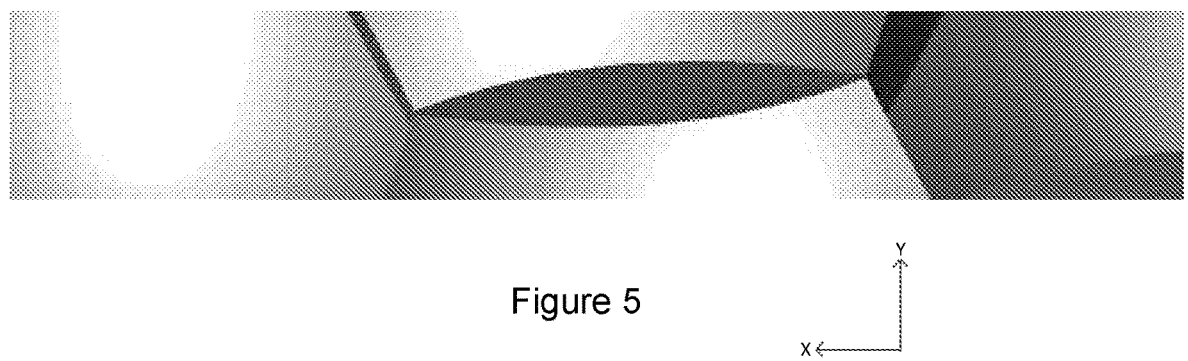
FIG. 5 shows a magnification of part of FIG. 4.

The use of alternating microlens types provides a reduction in the surface discontinuities at the edges of the microlenses. FIG. 5 shows an enlarged view of the edge region between a concave and convex microlens, which shows a much a smaller step between those microlenses compared to the previous design.

Figure 6:
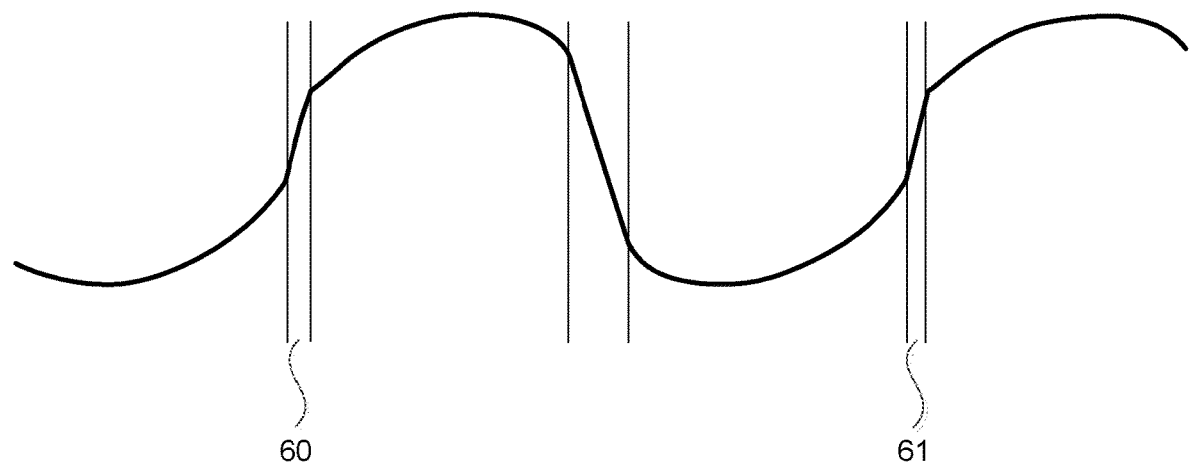
FIG. 6 shows a surface of the array of FIG. 4.

FIG. 6 shows the surface profile of a cross-section through the microlens array of FIG. 4 corresponding to the cross-section shown in FIG. 3. Compared to FIG. 3 the surface profile is much smoother and points of inflection are removed. The manufactured microlens array can thus match the design profile more accurately. Furthermore, two of the lossy regions 60, 61 are reduced in size due to the proximity of the microlens surface heights in those regions leading to a reduced transition area. The loss in those regions is therefore expected to decrease compared to the microlens array of FIG. 1. The lossy region 62 may be wider than that of FIG. 3, but it is expected that the reduction in size of the other regions will have a greater effect than this increase.

In an example array each microlens may have a diameter of 10-15 μm. The diameter of the microlenses is selected to provide appropriate optical performance; in particular as a trade-off between a larger diameter which gives reduced losses at the joints between microlenses but may lead to visibility of the microlenses by the user, and a smaller diameter which gives increases losses but potentially improves image quality. When a DMD or other electromechanical imaging device is set up to display a line which is 2 pixels wide, there are preferably at least 5 microlenses across the width of that line.

The microlens array of FIG. 4 can be described as a set of microlenses arranged in a regular repeating two dimensional array. The surface of each microlens is decentred in a first dimension of the array, and the microlens surfaces alternate between concave and convex in that first dimension. The example of FIG. 4 uses hexagonal microlenses, but the same principles apply to other shapes, such as square or rectangular. Where different shaped microlenses are utilised the angular output will match the microlens shape.

The microlenses of the array form a contiguous structure in which the optical axes of the microlenses are parallel to one another.

Figure 7:
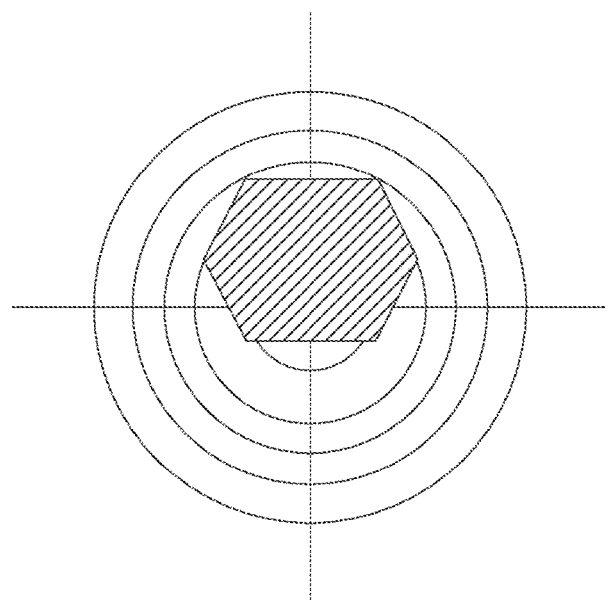
FIG. 7 shows a plot of angular output for the array of FIG. 4.

FIG. 7 shows a chart of the angular output profile of the microlens array of FIG. 3, which is a good match for the angular profile of the all-convex design of FIG. 1. Due to the improvement in manufacturing tolerance to the design profile, the efficiency of the microlens array of FIG. 3 is expected to be significantly improved.

Figure 8:
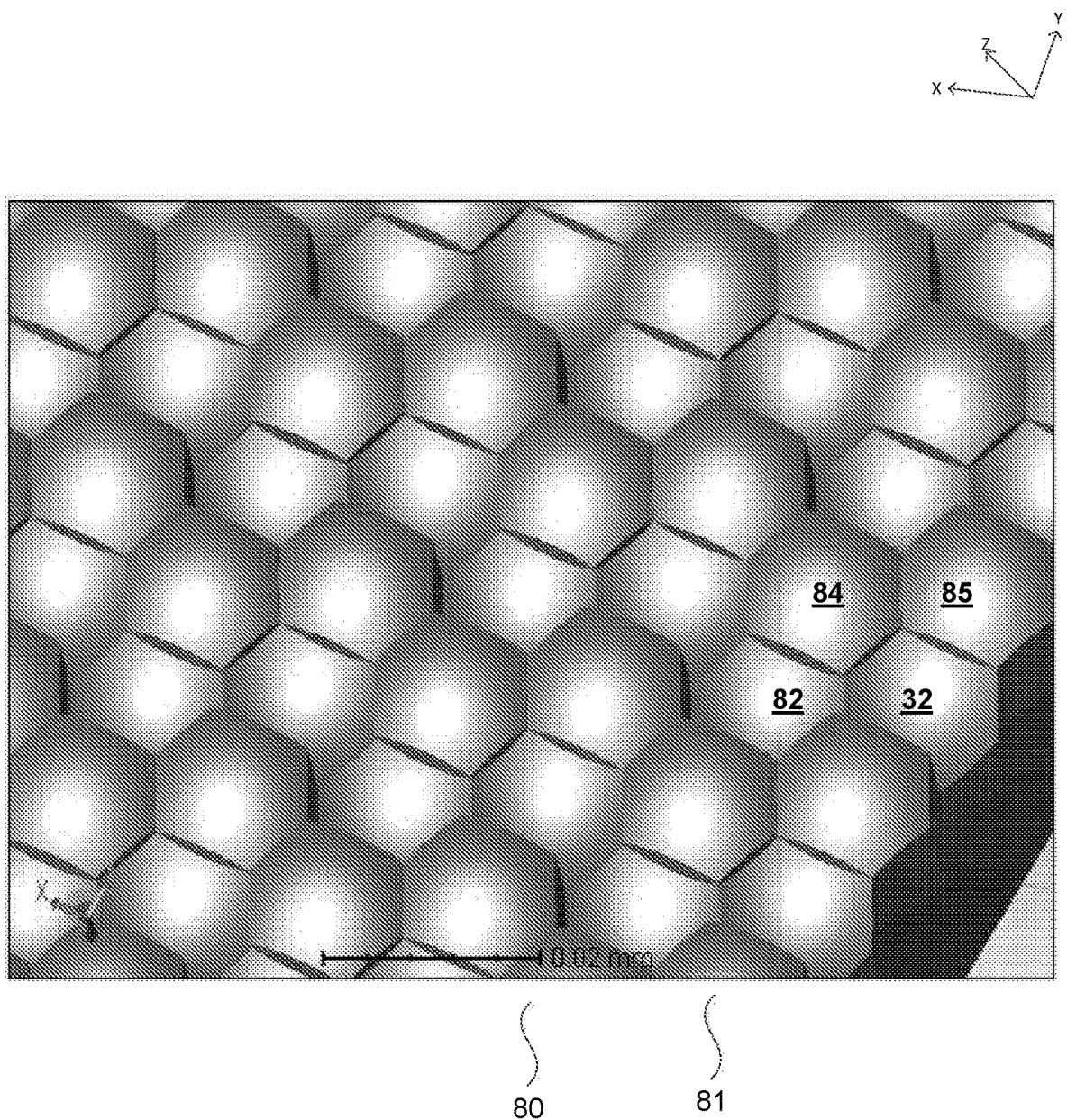
FIG. 8 shows a decentred microlens array with alternating microlens types.

FIG. 8 shows a schematic diagram of a further microlens array. The microlens array of FIG. 8 is similar to that of FIG. 4, but the surface heights of the microlenses are adjusted to reduce the difference in surface heights at the borders between adjacent microlenses. In particular, the surface height at the centre of each microlens is different to the surface height at the centre of an adjacent microlens of the same type (concave or convex). Expressed differently, the height of the microlenses forming the second column 80 in the y-direction have been lowered relative to the first column 81, such that the edges of adjacent lenses of the same type (for example 82, 83 and 84, 85) are aligned. This adjustment of heights reduces discontinuities between microlenses in many of the borders, thus reducing losses. The adjustment is continued across the array, such that the centres of microlenses in the first, third, fifth, etc columns are higher than microlenses of the same type in the second, fourth, sixth etc columns.

The microlens arrays described hereinbefore may be formed as a single piece of material with appropriate shaping of the surfaces, or could be formed from a set of individual microlenses joined together.

The arrays shown above are 2 dimensional arrays but the same principles may be applied to 1 dimensional arrays.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A microlens array for use in a head up display, the microlens array comprising:
   a plurality of microlenses arranged in a 2-dimensional array and forming a contiguous structure,
   wherein a first face of the microlens array comprises a plurality of microlens surfaces arranged in a regular pattern, each microlens surface corresponding to a microlens in the array of microlenses, wherein the microlens surfaces alternate between a concave type and a convex type along a dimension of the array,
   wherein each microlens is decentered parallel to the dimension in which the microlens surfaces alternate between the concave type and the convex type, such that a peak of each microlens surface is offset from a geometric centre of the respective microlens in a direction that is parallel to the dimension,
   wherein the peak of each microlens surface, of both the convex and concave type, is offset from the geometric centre of the respective microlens by a constant distance along the dimension, and
   wherein a surface height of the geometric centre of a microlens of a first array is different from a surface height of the geometric centre of an adjacent microlens of the same type of a second array adjacent to the first array, such that the adjacent microlens of the second array has an edge adjacent to an edge of the microlens of the first array, wherein a surface height at the edge of the adjacent microlens is the same as a surface height at the edge of the microlens of the first array.

2. The microlens array according to claim 1, wherein each microlens surface is hexagonal, rectangular, or square in plan view.

3. A head up display comprising the microlens array according to claim 2.

4. A head up display comprising the microlens array according to claim 1.

5. A microlens array comprising:
   a plurality of microlenses arranged in an array and forming a contiguous structure, each of the microlenses having a microlens surface, a microlens peak, and a geometric centre, the microlens surface of adjacent microlenses alternating between a concave type and a convex type along a dimension of the array,
   wherein each microlens peak is offset from a geometric centre of the respective microlens in a direction that is parallel to the dimension,
   wherein the direction and a distance that each microlens peak is offset is the same for each microlens of the same type in the array,
   wherein the microlens array is one-dimensional and positioned adjacent to an alternate microlens array, and wherein each adjacent microlens of the alternative microlens array comprises a surface that is either a concave type or a convex type, and
   wherein a surface height of the geometric centre of each microlens of a first array, is different from a surface height of the geometric centre of the adjacent microlens, of a second array adjacent to the first array, if the adjacent microlens surface is of the same type, such that the adjacent microlens of the second array has an edge adjacent to an edge of the microlens of the first array, wherein a surface height at the edge of the adjacent microlens is the same as a surface height at the edge of the microlens of the first array.

6. The microlens array of claim 5, comprising two dimensions, wherein a height of the geometric centre of each microlens of the same type is different from a height of the geometric centre of an adjacent microlens of the same type, such that a height difference at a border between adjacent microlenses of the same type is reduced compared to an alternative configuration where the height at the geometric centre of each adjacent microlens was the same.

7. A microlens array for use in a head up display, the microlens array comprising:
   a plurality of hexagonal shaped, plano-convex microlenses and a plurality of hexagonal shaped, plano-concave microlenses arranged in an alternating pattern in an array and forming a contiguous structure,
      each of the plano-convex microlenses having a convex surface and an opposite planar surface, and a microlens peak on the convex surface,
      each of the plano-concave microlenses having a concave surface and an opposite planar surface, and a microlens peak on the concave surface,
   wherein each plano-convex microlens peak is offset from a geometric centre of the convex surface in a direction that is parallel to a dimension of the array,
   wherein each plano-concave microlens peak is offset from a geometric centre of the concave surface in the direction that is parallel to the dimension of the array,
   wherein the direction and a distance that each plano-convex microlens peak and each plano-concave microlens peak is offset is the same, and
   wherein a surface height of the geometric centre of a microlens of a first array is different from a surface height of the geometric centre of an adjacent microlens of the same type of a second array adjacent to the first array, such that the adjacent microlens of the second array has an edge adjacent to an edge of the microlens of the first array, wherein a surface height at the edge of the adjacent microlens is the same as a surface height at the edge of the microlens of the first array.

* * * * *